W. M. Doty,

Washing Machine,

No. 2,897 Reissued Mar. 17, 1868

Witnesses:

Thos. H. Dingler

Geo. W. Reed

Inventor:

Wm. M. Doty

United States Patent Office.

WILLIAM M. DOTY OF NEW YORK, N. Y.

*Letters Patent No.* 43,483, *dated July* 12, 1864; *reissue No.* 2,897, *dated March* 17, 1868.

IMPROVED WASHING-MACHINE.

The Schedule referred to in these Letters Patent and making part of the same.

TO ALL WHOM IT MAY CONCERN:

Be it known that I, WILLIAM M. DOTY, of the city, county, and State of New York, have invented a new and improved Washing-Machine; and I hereby declare the following to be a full, clear, and exact description of the same, reference being had to the accompanying drawings, forming a part of this specification, in which—

Similar letters of reference in these three views indicate corresponding parts.

Figure 1:
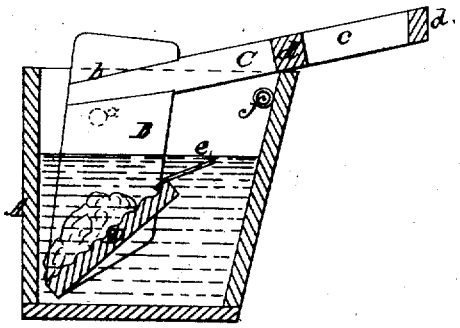
Figure 1 represents a transverse vertical section of a washing-machine constructed in accordance with my invention.

The object of this invention is threefold.

First. In all washing-machines in which the wash-board has a vibratory movement in an arc of a circle, tangent or nearly so to a plane parallel to the bottom of the tub, imparted to it by means of levers actuated by hand, the operation of so vibrating the board is extremely fatiguing, unless the board and the board-actuating levers bear a certain relationship to each other. One of the objects, therefore, of this invention is, first, to so combine the wash-board with its actuating-lever or levers, that the operation of vibrating them shall involve movements least fatiguing to the body, and to this effect—

1. The first part of my invention consists in the combination, with the corrugated washing-board and swinging brackets to which it is attached, of a lever or levers, to operate the same under the arrangement substantially as hereinafter described, so that the said board may be oscillated horizontally or back and forth, by a vibratory up-and-down movement of the levers.

Second. When washing-machines are not used, the protruding levers or arms, particularly those arranged to project laterally from the tub, are calculated to take up much space in the room in which the machine is located, and are for this reason a source of great inconvenience and annoyance; again, for purposes of transportation, the projecting levers would prove an insuperable objection; and the object of the second part of this invention, therefore, is to remove these objections, and to this end my invention consists, 2. In the combination of the oscillating wash-board swinging brackets with a removable hand-lever or levers, operating in the manner substantially as hereinafter shown and described, and 3. In the formation, in the swinging brackets, to which the corrugated wash-board is attached, of sockets, or the mechanical equivalent thereof, for the ready insertion and removal of the operating-lever, substantially as and for the purposes hereinafter shown and described.

Third. It has been found by experience that machine-washing, unless accompanied by or practised in connection with occasional hand-washing, is not of great practical value, and this will be understood when it is considered that the clothes are frequently much more soiled in certain exposed parts, and that therefore the primary rubbing of the clothes, until all the parts are equally clean, must necessitate excessive washing of the parts already clean, which is destructive of clothes and wasteful of time and labor. Now to wash these more soiled portions of the clothes preliminarily, or at any time during the washing-operation, by hand, against a stationary wash-board, must involve the use of another wash-tub, and the transporting of the wet clothes from one tub into the other. To avoid these inconveniences is the object of the third part of my invention, and I have accomplished it by combining in one machine the means whereby machine-washing and hand-washing can be carried on at the pleasure of the operator or according to circumstances. To this end my invention consists, 4. In the combination, with an oscillatory wash-board and stationary wash-tub, of a hook and eye, or the mechanical equivalent thereof, for rendering the said wash-board stationary within the tub, at the pleasure of the operator.

To enable others to make and use my said invention, I shall now proceed to describe the manner in which the same is or may be carried into effect, and, referring to the drawings, A represents a tub, made of suitable material, which may be permanently fixed in the room or apartment in which the washing is to be performed. This tub is provided with two pendent arms or brackets, B, which are secured to the sides of the tub by means of pivots, *a*, which may either be made to pass through the ends of the tub, or suitable brackets might be fastened to the tub to form the bearings. The upper ends of the brackets B are furnished with dove-tailed sockets *b*, to receive and retain the hand-lever C, which serves to impart motion to the wash-board D. The hand-lever C is composed of two longitudinal bars, *c*, which are connected by cross-bars *d*, and it is fitted into the sockets *b*, so that it can easily be inserted or withdrawn, as may be desired.

The wash-board D is firmly connected to the brackets B, and it is set in an inclined position, as clearly shown in fig. 1 of the drawings, so that the same, when it is brought down, compresses the clothes between its lower edge and the side of the tub, and at the same time, by the action of the inclined wash-board, the clothes are turned over and over automatically, and every part of the same is exposed to the action of the water and of the wash-board.

Figure 2:
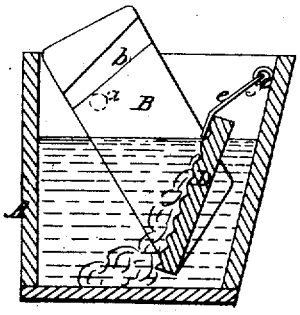
Figure 2 is a similar section of the same, with the board rendered stationary for hand-washing.
Figure 3:
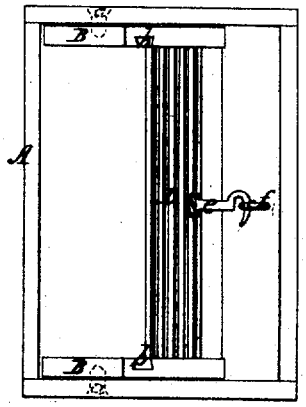
Figure 3 is a plan or top view of the same, with the board in the position shown in fig. 2.

The upper part of said wash-board is corrugated similarly to an ordinary hand wash-board, and it is provided with a hook, *e*, so that it can be inserted into a loop or eye, *f*, fastened to the inside of the tub, as shown in fig. 2 of the drawing. If the wash-board is secured in this position, and the hand-lever removed, said board can be used as an ordinary hand wash-board, or, if it be desired to have the unobstructed use of the tub, the entire washing-mechanism is taken out by removing the pivots *a*.

By these means the washing of clothes can be effected in a stationary wash-tub, either by the action of the pressure-board, or in the ordinary manner of hand-washing, or the tub can be used independently of the washing-mechanism, like an ordinary tub.

The full benefit of the washing-machine can thus be obtained, without the necessity of having a separate tub, which is in the way during the whole time when no washing is to be done.

Having now described my invention, and the manner in which the same is or may be carried into effect, what I claim, and desire to secure by Letters Patent, is—

1. The combination of the oscillating wash-board and swinging brackets with a removable hand-lever or levers, operating in the manner substantially as herein shown and described.

2. The formation, in swinging brackets, to which the corrugated wash-board is attached, of sockets, or the mechanical equivalents thereof, for the ready insertion and removal of the operating-lever, substantially as and for the purposes herein shown and described.

3. The combination, with an oscillatory wash-board and stationary wash-tub, of the means herein shown and described, or the mechanical equivalent thereof, for rendering the said wash-board stationary within the tub, at the pleasure of the operator.

In testimony whereof, I have hereunto signed my name, before two subscribing witnesses.

WM. M. DOTY.

Witnesses:

A. POLLOK,

M. BAILEY.